United States Patent
Kwon et al.

(10) Patent No.: US 7,916,683 B2
(45) Date of Patent: Mar. 29, 2011

(54) WIRELESS NETWORK SYSTEM AND METHOD OF TRANSMITTING/RECEIVING DATA IN WIRELESS NETWORK

(75) Inventors: Chang-yeul Kwon, Yongin-si (KR); Se-young Shin, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 581 days.

(21) Appl. No.: 11/708,337

(22) Filed: Feb. 21, 2007

(65) Prior Publication Data

US 2007/0248072 A1    Oct. 25, 2007

Related U.S. Application Data

(60) Provisional application No. 60/793,712, filed on Apr. 21, 2006.

(30) Foreign Application Priority Data

Sep. 4, 2006  (KR) .................. 10-2006-0084874

(51) Int. Cl.
*H04B 7/00* (2006.01)
(52) U.S. Cl. ......... 370/322; 370/348; 370/443; 370/447
(58) Field of Classification Search .................. 370/322, 370/336–338, 347–348, 442–443, 445, 447–448
See application file for complete search history.

(56) References Cited

U.S. PATENT DOCUMENTS

| 2003/0063619 A1* | 4/2003 | Montano et al. ............ 370/443 |
| 2004/0217948 A1* | 11/2004 | Kawasaki et al. ............ 345/204 |
| 2004/0264428 A1* | 12/2004 | Choi et al. .................... 370/338 |

FOREIGN PATENT DOCUMENTS

| KR | 10-2005-0040445 A | 5/2005 |
| KR | 10-2006-0003560 A | 1/2006 |

\* cited by examiner

*Primary Examiner* — Ricky Ngo
*Assistant Examiner* — Pao Sinkantarakorn
(74) *Attorney, Agent, or Firm* — Sughrue Mion, PLLC

(57) ABSTRACT

Provided are a wireless network system and a method of transmitting/receiving data in the wireless network system, which separately set a period where a packet for requesting and approving bandwidth allocation of a network in a super frame period is transmitted/received, and as a result, transmit/receive data through the allocated bandwidth. Also provided is a wireless network coordinator, which includes an MAC unit which generates a beacon frame for organizing a super frame including at least one or more channel time blocks, and bandwidth management unit which sets a specific channel time block among the channel time blocks as a period where a bandwidth allocation packet in the network is transmitted/received, and a physical unit which transmits the beacon frame including information on the setting by the bandwidth management unit through a designated communication channel.

37 Claims, 10 Drawing Sheets

WIRELESS NETWORK SYSTEM AND METHOD OF TRANSMITTING/RECEIVING DATA IN WIRELESS NETWORK

CROSS-REFERENCE TO RELATED APPLICATION

This application and claims priority from Korean Patent Application No. 10-2006-0084874 filed on Sep. 4, 2006, in the Korean Intellectual Property Office, and U.S. Provisional Patent Application No. 60/793,712 filed on Apr. 21, 2006 in the United States Patent and Trademark Office, the disclosures of which are entirely incorporated herein by reference.

BACKGROUND OF THE INVENTION

1. Field of the Invention

Systems and methods consistent with the present invention relate to wireless transmitting/receiving data in a wireless network, and more particularly, to a wireless network system and a method of transmitting/receiving data in the wireless network system, in which a period of a super frame for transmission/reception of a packet for request and approval of bandwidth allocation in the network is separately set and data are then transmitted/received through the allocated bandwidth.

2. Description of the Related Art

FIG. 1 is a view illustrating a half-duplex wireless network using related art Request-To-Send (RTS) signals and Clear-To-Send (CTS) signals.

In general, a wireless network uses a half-duplex scheme by which it is impossible to simultaneously perform transmission and reception, and an RTS signal 111 and a CTS signal 121 are used in order to prevent collision due to media occupation during access of wireless media using the half-duplex scheme.

A transmitting station 110 including a frame to be sent, first starts the transmission process by transmitting the RTS signal 111, all neighboring stations which have received the RTS signal 111 stop generating radio waves. When a receiving station 120 receives the RTS signal 111, it responds to the RTS signal 111 by transmitting the CTS signal 121, which also makes all neighboring stations stop generating radio waves. The transmitting station 110 which has received the CTS signal 121 transmits a frame 112 and then receives the acknowledgement signal 122 from the receiving station 120 which has received the frame 112.

Carrier Sense Multiple Access with Collision Avoidance (CSMA/CA), which corresponds to a Media Access Control (MAC) algorithm usually used in a wireless local area network (LAN), is provided by a Distributed Coordination Function (DCF) which, as in Ethernet, identifies whether a wireless link is clear or in use before the transmitting station 110 transmits the frame 112, and which makes use of any back-off at the time of the end of each frame in order to avoid a collision with other stations.

A function of carrier sense is used to decide whether media is available or not, and is classified into a function of physical carrier sensing and a function of a virtual carrier sensing. The function of physical carrier sensing is provided by a physical layer, and depends on an adopted media and a scheme of modulation. The function of a virtual carrier sensing is provided by a Network Allocation Vector (NAV), wherein the NAV refers to a timer which implies the time information in a case where media have been reserved. The NAV is included in and transmitted by the frame header of the RTS signal 111 and the CTS signal 121, and the transmitting station 110 and the receiving station 120 set times, which are necessary to complete their operations, to the NAV to prevent other stations from using the media.

Meanwhile, timing is based on a super frame under the circumstances of a wireless personal area network (PAN).

FIG. 2 is a view illustrating a related art super frame which includes a Beacon Period 210, a Contention Access Period 220, and a Channel Time Allocation Period 230. Asynchronous Data or a control Command is transmitted/received through the Contention Access Period 220. The Channel Time Allocation Period 230 includes a Channel Time Allocation (CTA) 232 and a Management CTA (MCTA) 231. The Control command, Isochronous Data or Asynchronous Data are transmitted/received through the CTA 232.

The length of the Contention Access Period 220 is determined by an access point, and is transmitted to the stations constituting the network through the beacon frames which are distributed to the Beacon Period 210.

The above-mentioned CSMA/CA is used as a media access scheme during the Contention Access Period 220. On the other hand, a Time Division Multiple Access (TDMA) scheme including a specified time window per each station is used during the Channel Time Allocation Period 230. An access point allocates a channel time to a device requesting an access to media, and transmits/receives data to and from the corresponding station during the allocating period. Here, the MCTA 231 is allocated to a pair of stations that intend to transmit/receive data to and from each other to be used to access the TDMA, otherwise, it is used as common CTA that uses a Slotted Aloha protocol.

During data transmission, not only the scheme where compressed data is transmitted with the bandwidth of several gigahertz (GHz), but also the scheme where uncompressed data is transmitted with the bandwidth of scores of GHz is being tried out. The uncompressed data, the volume of which is larger than that of the compressed data, are possible to be transmitted with only scores of GHz-bandwidth, and though there is loss of packets during data transmission, is less affected on the output of the data than the compressed data is.

Here, it is necessary for a transmitting station to request a bandwidth allocation and to receive acknowledgement of approval of bandwidth allocation in order to transmit data, and the transmission can be carried out during the Contention Access Period 220.

That is, the transmitting station should contend with other existing stations in the network for access to media, at this time, if the transmitting station does not receive the approval of a bandwidth allocation via the contention, it has to wait for the next contention period or the next super frame.

It may be inconvenient for a user of a receiving station, who intends to receive the multimedia contents from the transmitting station to regenerate them at real time, to have data reception delay caused by the reasons above. Accordingly, there is a need for a method of operating a contention scheme more reasonably for transmitting/receiving data.

SUMMARY OF THE INVENTION

Exemplary embodiments of the present invention overcome the above disadvantages and other disadvantages not described above. Also, the present invention is not required to overcome the disadvantages described above, and an exemplary embodiment of the present invention may not overcome any of the problems described above.

The present invention provides a wireless network system and a method of transmitting/receiving data in the wireless network system, in which a period of the super frame for transmission/reception of a packet for request and approval of the bandwidth allocation in the network is separately set and data are then transmitted/received through the allocated bandwidth.

According to an aspect of the present invention, there is provided a wireless network coordinator including an MAC unit generating a Beacon Frame for constituting a Super Frame including at least one or more Channel Time Blocks, and bandwidth management unit setting up a specific channel time block out of the channel time blocks as the period where a bandwidth allocation packet for Bandwidth Allocation in the network is transmitted/received, and a physical unit transmitting the beacon frame including the information on the setting up above through the designated communication channel.

According to another aspect of the present invention, there is provided a station including a decision unit deciding with reference to the received beacon frame whether the period where the bandwidth allocation packet for allocating the bandwidth in the network is transmitted/received is included in the super frame or not, an MAC unit generating a bandwidth allocation request packet for allocating the bandwidth above according to the decision, and a physical unit transmitting the bandwidth allocation request packet through the designated communication channel.

According to still another aspect of the present invention, there is provided a method of configuring a wireless network, the method including generating a beacon frame for constituting a super frame including at least one or more one channel time block, setting up a specific channel time block from among the channel time blocks as the period where a bandwidth allocation packet for Bandwidth Allocation in a network is transmitted/received, and transmitting the beacon frame including the information on the setting up through the designated communication channel.

According to yet another aspect of the present invention, there is provided a method of transmitting/receiving data, the method including deciding with reference to the received beacon frame whether the period where the bandwidth allocation packet for allocating the bandwidth in a network is transmitted/received is included in the super frame or not, generating a bandwidth allocation request packet for allocating the bandwidth above according to the decision, and transmitting the bandwidth allocation request packet through the designated communication channel.

BRIEF DESCRIPTION OF THE DRAWINGS

The above and other aspects of the present invention will be more apparent from the following detailed description of exemplary embodiments taken in conjunction with the accompanying drawings, in which.

DETAILED DESCRIPTION OF EXEMPLARY EMBODIMENTS

Figure 1:
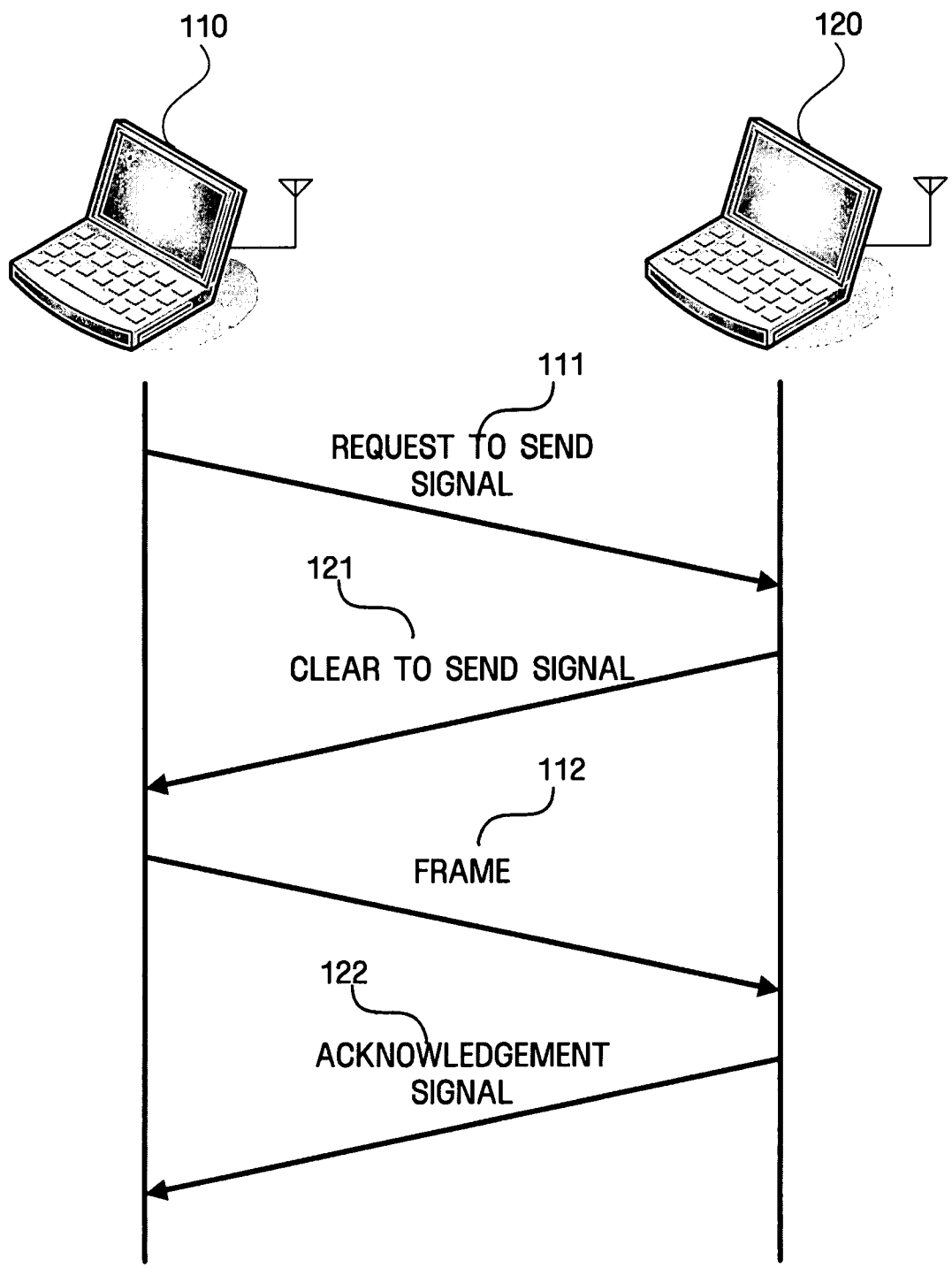
FIG. 1 is a view illustrating a half-duplex wireless network using related art Request To Send signals and Clear To Send signals.
Figure 2:
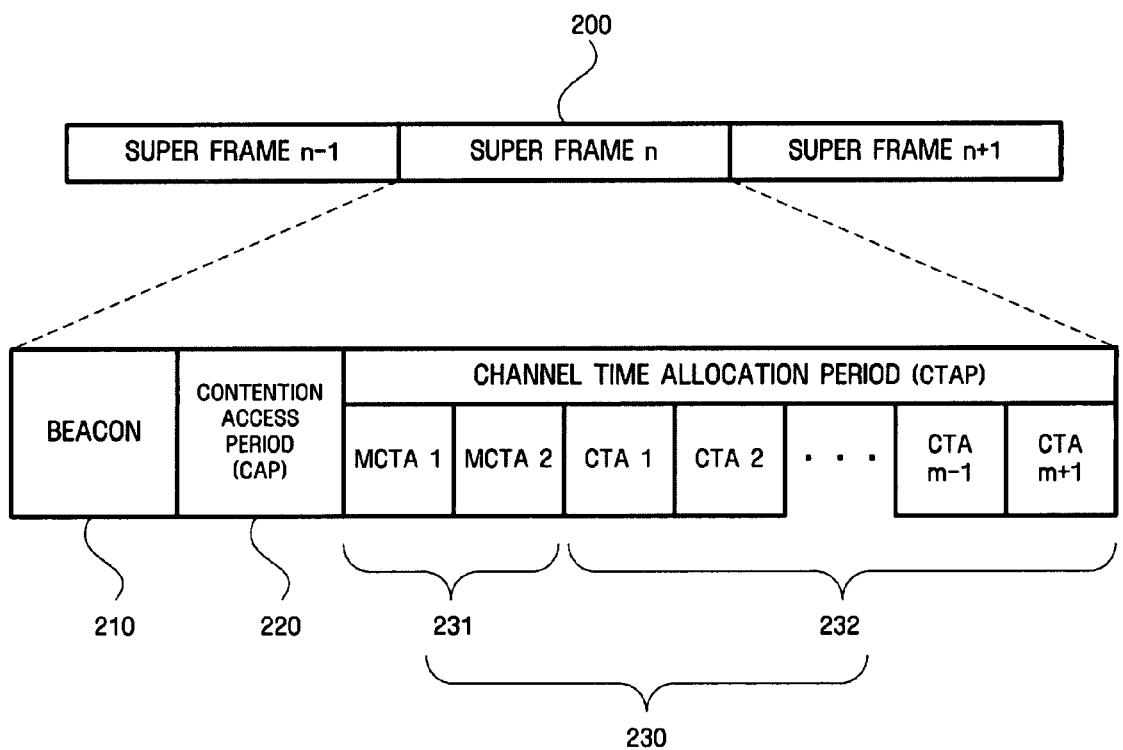
FIG. 2 is a view illustrating a related art super frame.

Advantages and features of the present invention, and ways to achieve them will be apparent from exemplary embodiments of the present invention as will be described below together with the accompanying drawings. However, the scope of the present invention is not limited to such exemplary embodiments and the present invention may be realized in various forms. The exemplary embodiments to be described below are nothing but the ones provided to bring the disclosure of the present invention to perfection and assist those skilled in the art to completely understand the present invention. The present invention is defined only by the scope of the appended claims. Also, the same reference numerals are used to designate the same elements throughout the specification.

Hereinafter, exemplary embodiments of the present invention will be described in detail with reference to attached drawings.

Figure 3:
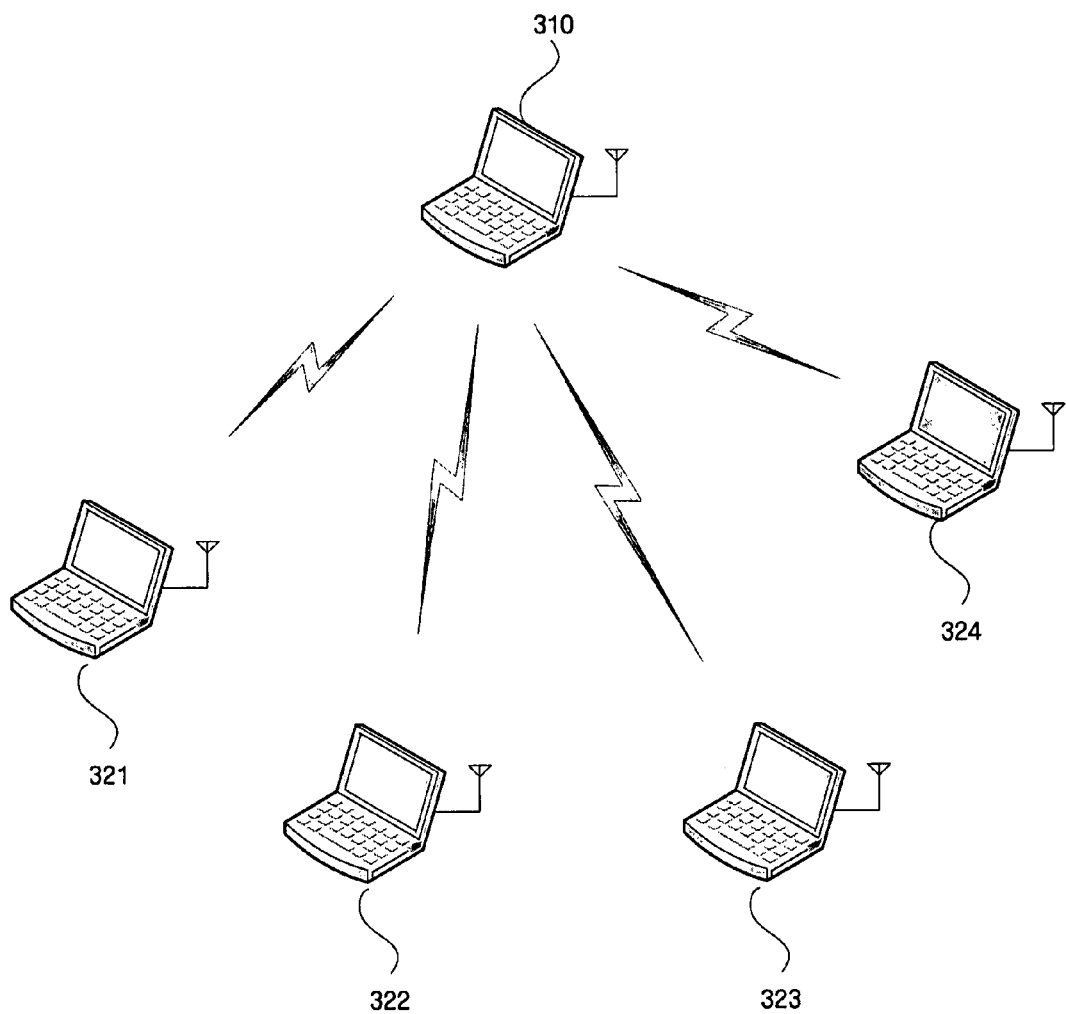
FIG. 3 is a view illustrating of a wireless network system according to an exemplary embodiment of the present invention.

FIG. 3 is a view illustrating the conception of a wireless network system according to an exemplary embodiment of the present invention. A wireless network system includes a wireless network coordinator 310 and wireless network stations 321, 322, 323, and 324.

The wireless coordinator 310 transmits a beacon frame, and serves to control bandwidth allocation of the stations 321, 322, 323 and 324 which exist in a network. Namely, one or more stations 321, 322, 323, and 324, which constitute the network, refer to a received beacon frame, and stand by in order to obtain the bandwidth allocation. Otherwise, in a case where bandwidth is allocated to a station, the station comes to be able to transmit data to other stations in an allocated bandwidth.

A network according to an exemplary embodiment of the present invention is constituted in connection with the super frame which includes at least one channel time block, and the channel time block is classified into a reserved channel time block corresponding to a time period, which is reserved so that bandwidth may be allocated to a specified station in the network and an unreserved channel time block corresponding to a time period, in which bandwidth is allocated to a station which is selected through competition among the stations in the network. Herein, the channel time block represents a time period during which data are transmitted or received among the stations existing in the network. Also, the reserved channel time block and the unreserved channel time block correspond to a channel time allocation period and a contention access period, respectively.

The station, which is to transmit data, either competes with the other stations in the unreserved channel time block to transmit the data, or is able to transmit the data in the reserved channel time block which is allocated to the station.

Here, a single super frame can include at least one or more reserved channel time blocks, wherein a specified reserved channel time block can be set to a period (hereinafter, referred to as "reserved period") during which a packet for bandwidth allocation for another reserved channel time block (hereinafter, referred to as "bandwidth allocation packet") is transmitted/received.

Accordingly, the station, to which bandwidth is not allocated through the contention at either the unreserved channel time block or reserved channel time block, comes to be able to be allocated the bandwidth by again contending with another station during the reserved period.

The band of frequency of the bandwidth allocated during the reserved period may be a high frequency band of 60 GHz.

Figure 4:
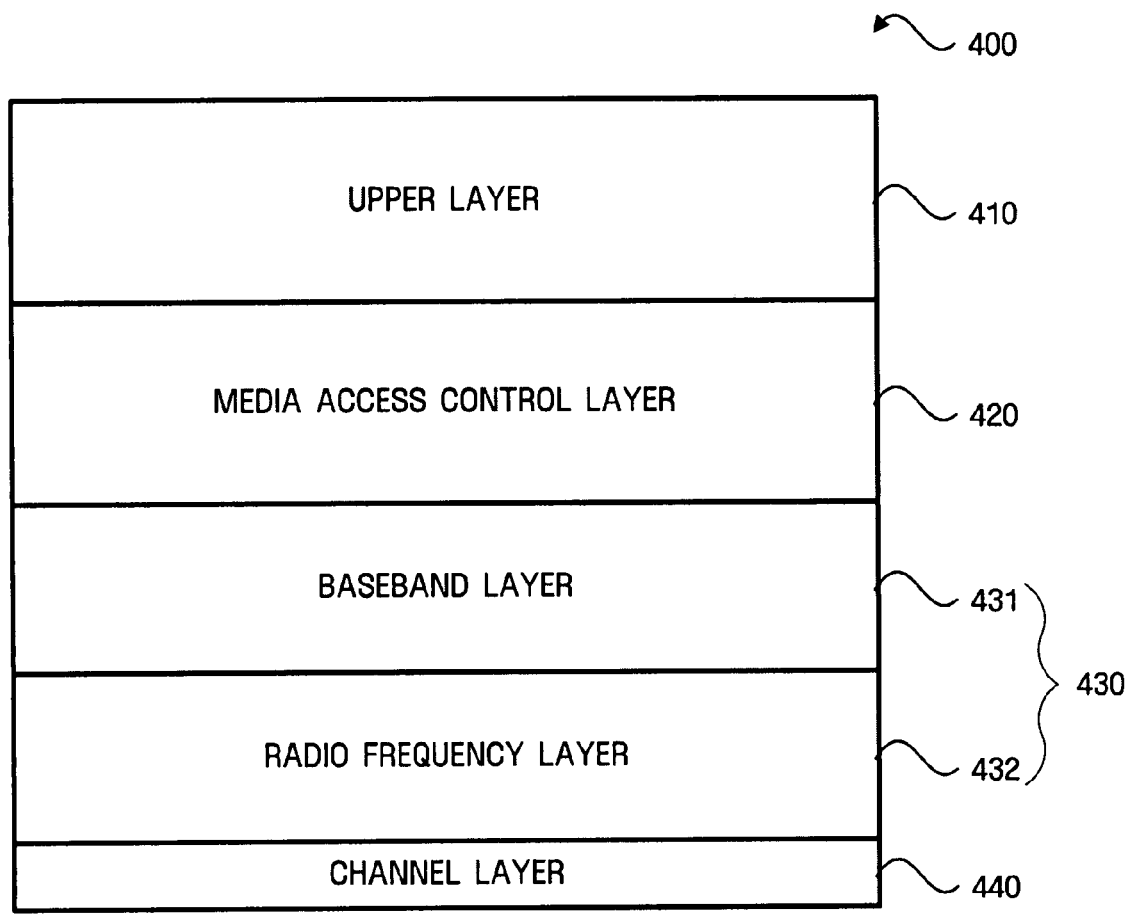
FIG. 4 is a view illustrating a communication layer according to an exemplary embodiment of the present invention.

FIG. 4 is a view illustrating a communication layer according to an exemplary embodiment of the present invention.

Generally, a communication layer 400 includes the channel layer 440 which is located at the lowest layer and which means physical medium in a designated frequency bandwidth in which a radio signal propagates, a physical layer 430 which includes a Radio Frequency (RF) layer 432 and a baseband layer 431, an MAC layer 420, and an upper layer 410. Herein, the upper layer 410, which is higher than the MAC layer 420, can include a Long Link Control (LLC) layer, a network layer, a transmission layer, an application layer, and so forth.

A radio frequency channel according to an exemplary embodiment of the present invention can include not only a low frequency bandwidth such as 2.4 GHz or 5 GHz, but also a high frequency bandwidth such as 60 GHz. Therefore, the channel layer 440 can carry out not only a non-directional communication, but also a unidirectional communication.

Figure 5:
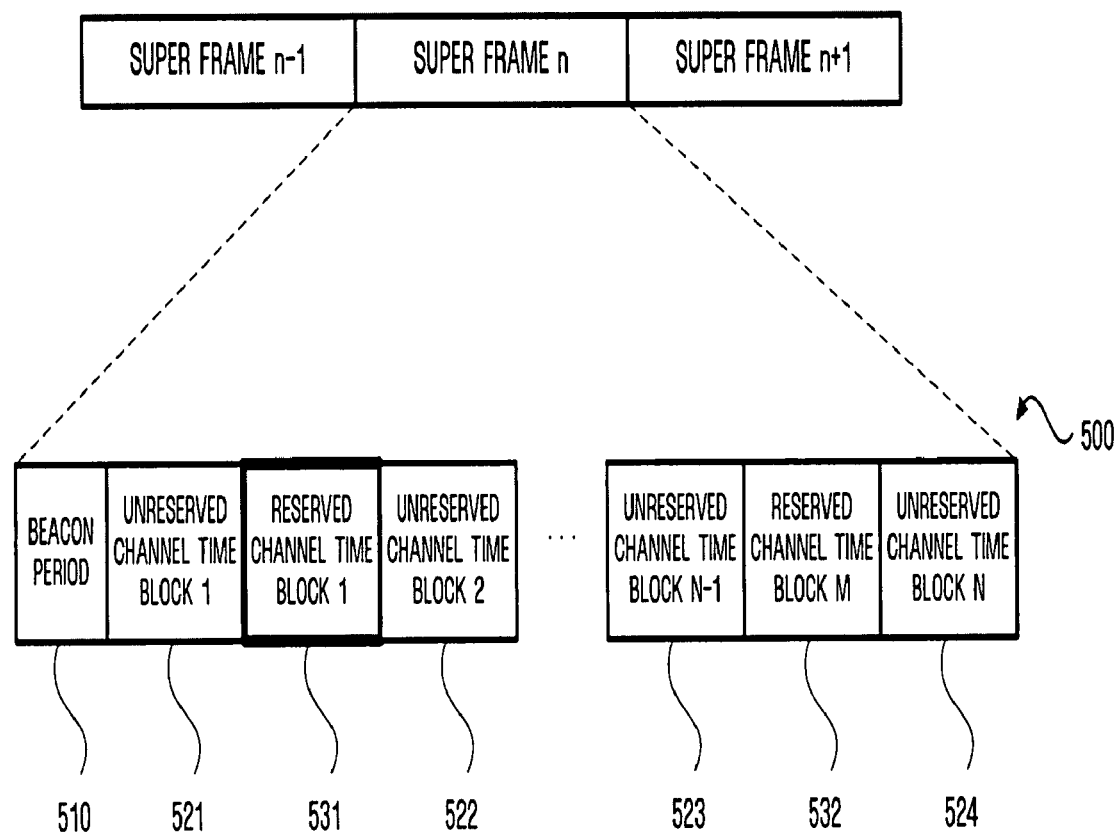
FIG. 5 is a view illustrating a super frame according to an exemplary embodiment of the present invention.

FIG. 5 is a view illustrating a super frame according to an exemplary embodiment of the present invention. The super frame 500 includes a beacon period 510, unreserved channel time blocks 521, 522, 523, and 524, and reserved channel time blocks 531 and 532.

During the beacon period 510, the wireless network coordinator distributes a beacon frame. The stations, each of which receives the beacon frame, refer to reservation information included in the beacon frame, then compete with one another in obtaining bandwidth in the network, and become able to transmit data to and receive data from the stations.

The unreserved channel time blocks 521, 522, 523, and 524 correspond to periods during which more than two stations, which are to transmit data, compete with one another, and the only station which is selected in the competition can transmit data in an allocated bandwidth.

The reserved channel time blocks 531 and 532 correspond to periods during which bandwidth is allocated to a specified station, and the only specified station, to which the bandwidth is allocated, can transmit data, which the specified station intends to transmit, in the allocated bandwidth.

As illustrated in FIG. 5, a single super frame can include at least one unreserved channel time block 521, 522, 523 and 524, and at least one reserved channel time block 531 and 532, wherein a specified reserved channel time block 531 can be set to the reserved period. Namely, stations existing in the network contend with each other for obtaining the bandwidth allocation at another reserved channel time block. The contention can be carried out when the bandwidth allocation packet to/from the wireless network coordinator.

For this purpose, the beacon frame may include schedule information 600 having at least one or more schedule blocks 630. The information, which relates to the bandwidth allocation in the network or operating the network and the like, is included in each of the schedule blocks 631, 632, 633 and distributed to stations.

Figure 6:
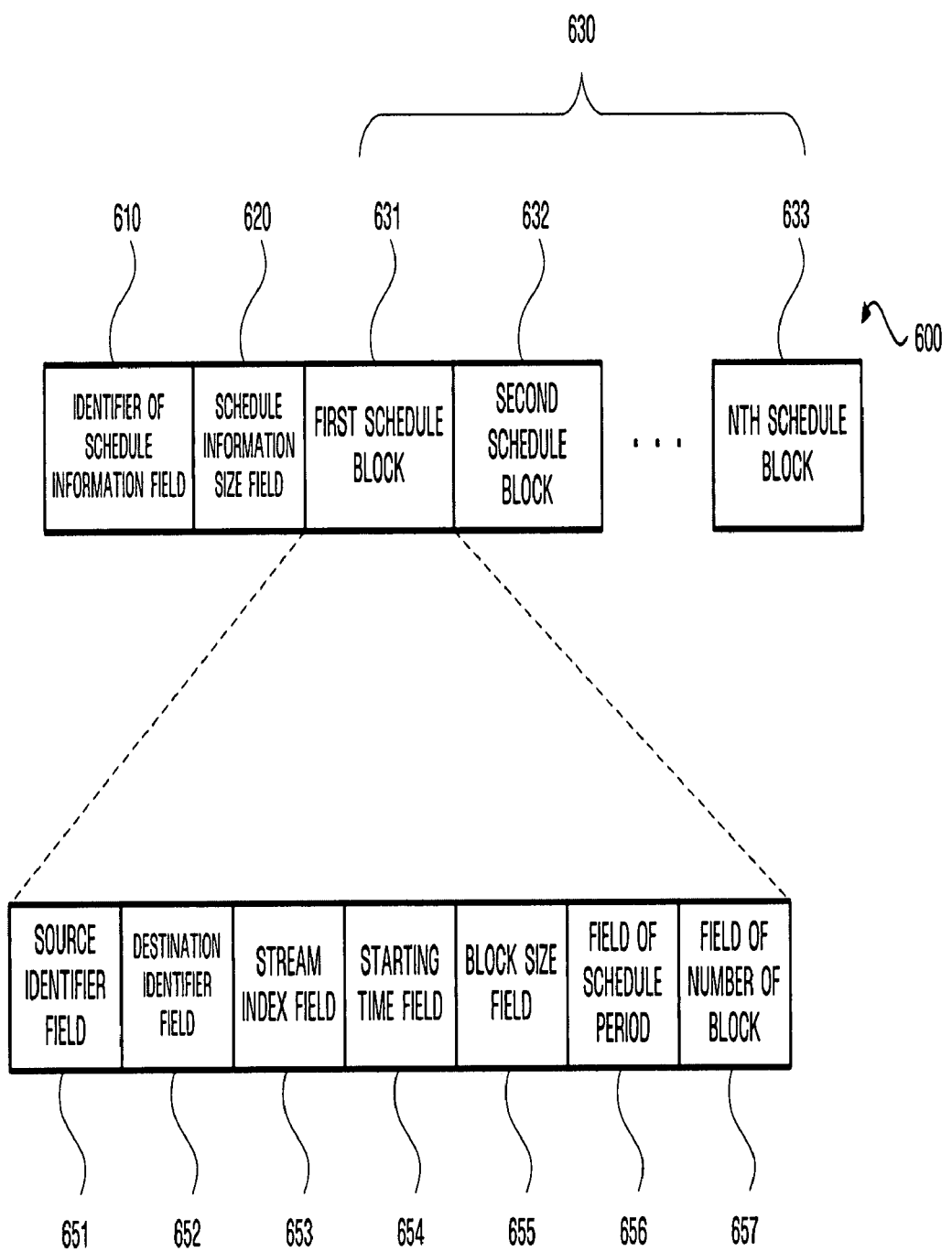
FIG. 6 is a view illustrating schedule information according to an exemplary embodiment of the present invention.

FIG. 6 is a view illustrating schedule information according to an exemplary embodiment of the present invention.

Referring to FIG. 6, the schedule information 600 can include an identifier field of schedule information 610, a size field of schedule information 620 and at least one or more schedule block 630.

The an identifier field of schedule information 610 shows specifically a flag or a unique identifier which represents that a relevant information corresponds to the schedule information, and size field of schedule information 620 shows specifically the whole size of the schedule information.

The identifier field of schedule information 610 may include information representing whether the bandwidth allocation is static or dynamic. For example, when an isochronous data is transmitted/received, the flag representing the corresponding channel time block has been allocated statically in the identifier field of schedule information 610.

Each of the schedule blocks 631, 632, 633 respectively include at least one or more information element. The information element includes at least one field among a source identifier field 651, a destination identifier field 652, a stream index field, 653, a starting time field 654, a block size field 655, a schedule period field 656, and a number of blocks field 657. The source identifier field 651 indicates a source station which transmits designated data, the destination identifier field 652 indicates a destination station which receives the designated data, the stream index field 653 indicates a sorts of the data assigned to be transmitted/received at the channel time block, the starting time field 654 indicates the starting time of the channel time block in the super frame, the block size field 655 indicates the size of the channel time block, the schedule period field 656 indicates the spacing among the successive channel time blocks, and the number of blocks field 657 indicates the number of the channel time blocks that are included in the super frame.

In the information element, the sorts of data shown in the stream index field 653 can be asynchronous data, management traffic, an unassigned stream, and a value representing bandwidth reservation traffic. That is, if the value representing bandwidth reservation traffic is shown in the stream index field 653, it is indicated that a channel time block assigned by a corresponding schedule block has been set to a reserved period.

Furthermore, in order that the channel time block may be set to a reserved period, the station transmitting the bandwidth allocation request packet may be shown in the source identifier field, the station transmitting the bandwidth allocation response packet for the bandwidth allocation request packet may be shown in the destination identifier field, the value representing the starting time of the reserved period in the super frame may be shown in the starting time field, the size of the reserved period may be shown in the block size field, and the number of the reserved period included in the super frame may be included in the number of blocks field. Herein, since single reserved period may be included in single super frame, 1 can be input to the number of blocks field.

Figure 7:
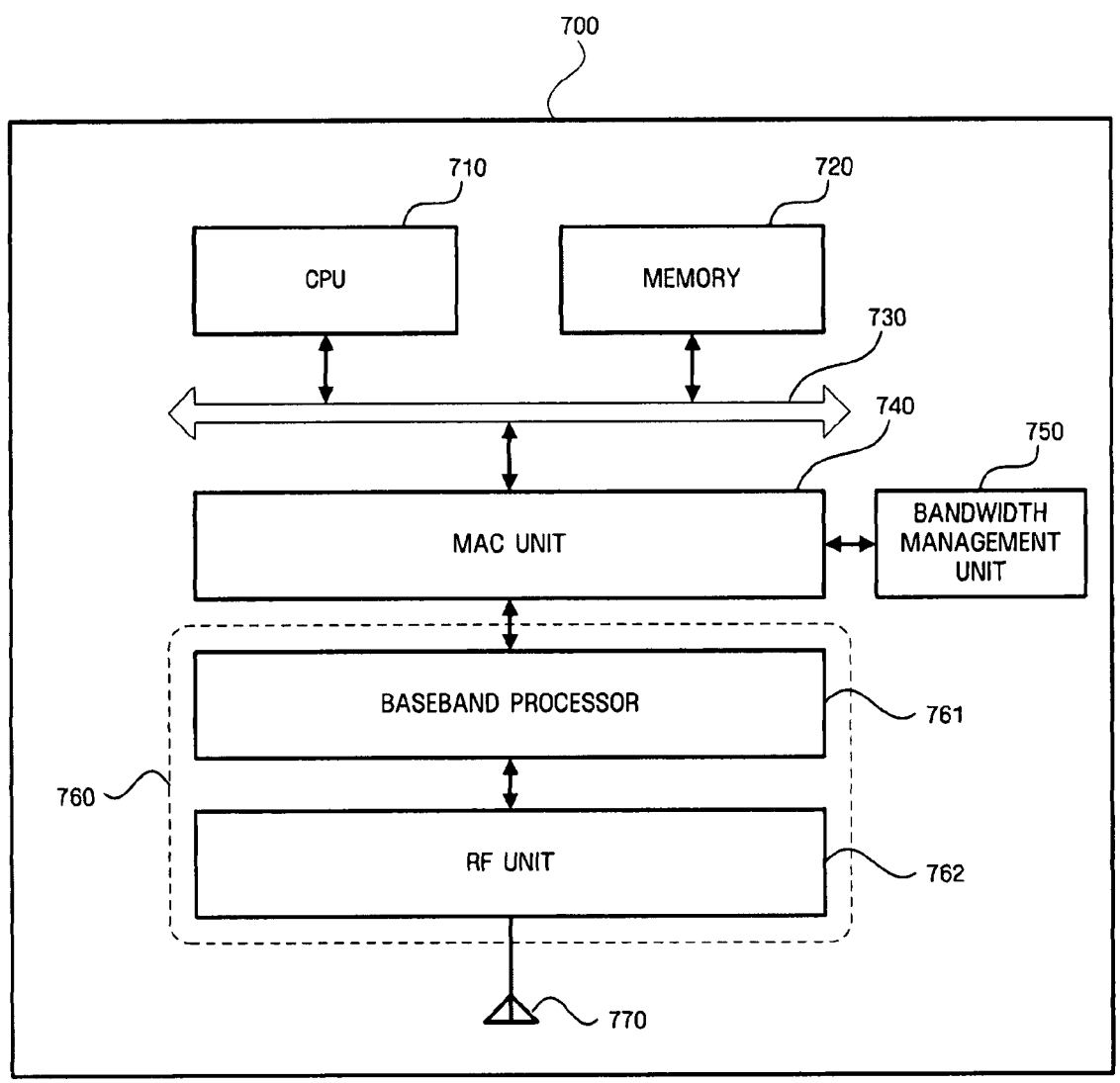
FIG. 7 is a block diagram illustrating a wireless network coordinator according to an exemplary embodiment of the present invention.

FIG. 7 is a block diagram illustrating a wireless network coordinator according to an exemplary embodiment of the present invention. With reference to FIG. 7, a wireless network coordinator 700 includes a Central Processing Unit (CPU) 710, a memory 720, an MAC unit 740, a bandwidth management unit 750, and a PHYsical (PHY) unit 760.

The CPU 710 controls the other units which are connected to a bus 730, and is in charge of a process with respect to the upper layer 410 which is illustrated in FIG. 4. Therefore, the CPU 710 processes receiving data (receiving MAC Service Data Unit; receiving MSDU) which is provided by the MAC unit 740, or generates transmission data (transmission MSDU) which is then provided to the MAC unit 740.

The memory 720 serves to store data. The memory 720 is a module, which is able to input/output information, such as a hard disc, an optical disc, a flash memory, a Compact Flash (CF) card, a Secure digital (SD) card, a Smart Media (SM) card, a MultiMedia Card (MMC), a memory stick, and so on. The wireless network coordinator 700 is equipped with the memory 720 either inside or with a separate equipment.

The MAC unit 740 serves to generate the beacon frame for constituting the super frame which includes at least one channel time block. Herein, the bandwidth management unit 750 can set a specified channel time block among channel time blocks to a period during which packets for bandwidth allocation in the network (i.e., a reserved period).

For this purpose, the bandwidth management unit 750 can insert reservation information into the one information element among the schedule blocks of the schedule information. More description in detail will be omitted since described above in FIG. 6.

The PHY unit 760 converts the beacon frame, which is generated by the MAC unit 740, into a radio signal, and serves to transmit the radio signal through a designated communication channel. For this purpose, the PHY unit 760 includes a baseband processor 761 and an RF unit 762, and is connected to an antenna 770. The antenna 770 is able to transmit or receive a directional radio signal in a high frequency band. Herein, the communication channel which is formed by the RF unit 762 includes a communication channel having, for example, a 60-GHz bandwidth.

The bandwidth allocation packet includes at least one of the bandwidth allocation request packet requesting the bandwidth allocation and the bandwidth allocation approval packet approving the bandwidth allocation. That is to say, while the station existing in the network can transmit the bandwidth allocation request packet to a wireless network coordinator during the reserved period, and the wireless network coordinator transmits the bandwidth allocation approval packet as a response.

Stations contend with each other for the purpose of transmitting/receiving the bandwidth allocation packet during the reserved period, the scheme of contending includes a scheme of CSMA/CA or a slotted aloha scheme.

Here, the station that has received the bandwidth allocation approval packet can transmit the data to be transmitted by itself through the allocated bandwidth, and at this time, the data may be uncompressed data as well as compressed data.

The bandwidth management unit 750 can allow all the stations existing in the network to contend with each other during the reserved period by setting the source identifier 651 among information elements of the schedule blocks to a broadcast, and also can allow only specified stations existing in the network to contend during a reserved period by setting the source identifier to a specified station.

Figure 8:
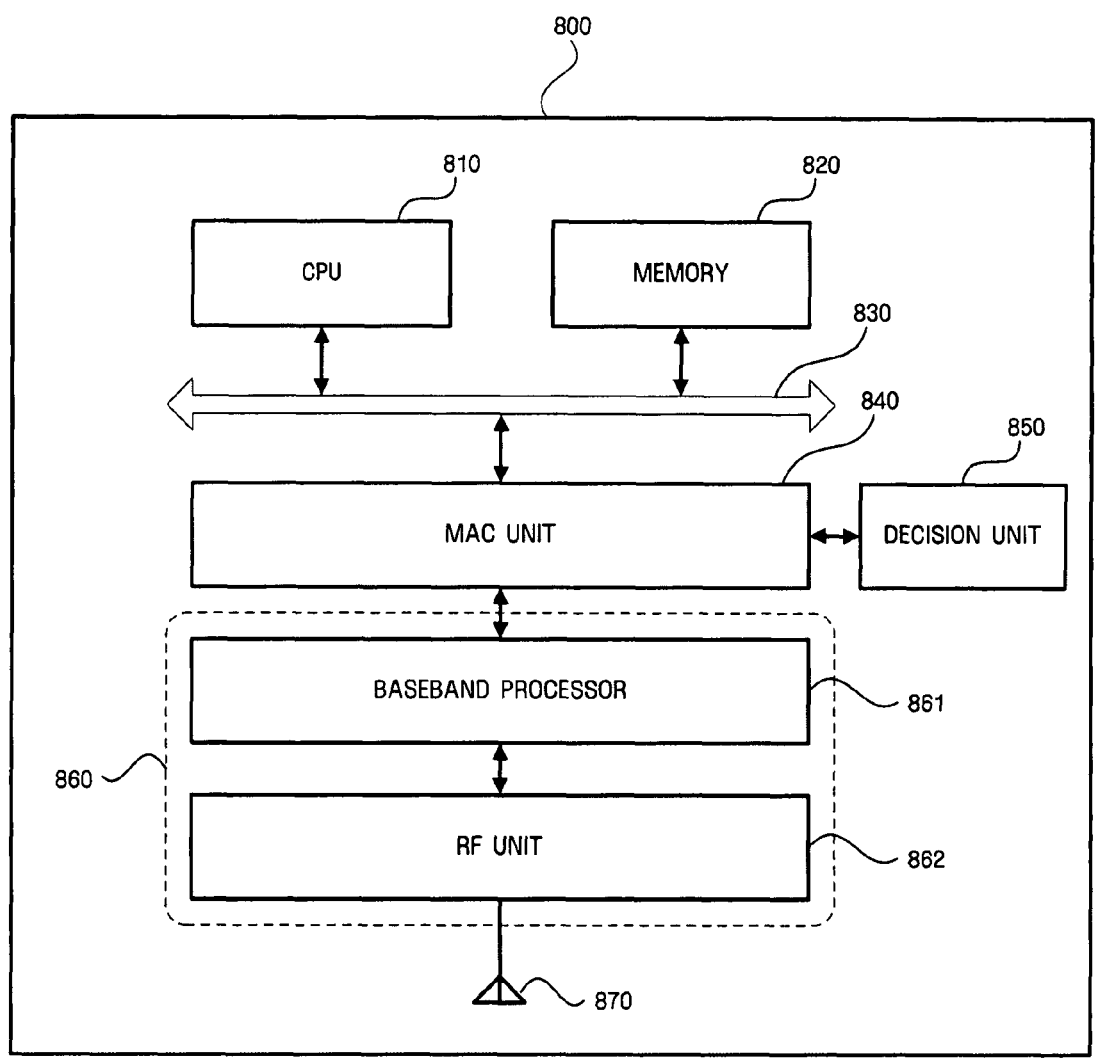
FIG. 8 is a block diagram illustrating a station according to an exemplary embodiment of the present invention.

FIG. 8 is a block diagram illustrating a station according to an exemplary embodiment of the present invention. Referring to FIG. 8, a station 800 includes a CPU 810, a memory 820, an MAC unit 840, a decision unit 850, and a PHY unit 860.

The CPU 810 controls the other units which are connected to a bus 830, and is in charge of a process with respect to the upper layer 410 which is illustrated in FIG. 4.

Therefore, the CPU 810 processes receiving data (receiving MSDU) which is provided by the MAC unit 840, or generates transmission data (transmission MSDU) which is then provided to the MAC unit 840.

The memory 820 serves to store data. The memory 820 is a module, which is able to input or output information, such as a hard disc, an optical disc, a flash memory, a CF card, an SD card, an SM card, an MMC, a memory stick, and so on. The station 800 is equipped with the memory 820 either inside or with separate equipment.

The MAC unit 840 adds an MAC header to an MSDU (i.e., data to be transmitted) which is provided by the CPU 810, and generates an MAC Protocol Data Unit (MPDU).

The PHY unit 860 converts the MPDU, which is generated by the MAC unit 840, into a radio signal, and serves to transmit the radio signal through a communication channel. For this purpose, the PHY unit 860 includes a baseband processor 861 and an RF unit 862, and is connected to an antenna 870. The antenna 870 is able to transmit or receive a directional radio signal in a high frequency band.

The baseband processor 861 adds a signal field and a preamble to the MPDU provided by the MAC unit 840, and generates a Presentation Protocol Data Unit (PPDU). Successively, the RF unit 862 converts the PPDU into a radio signal, and transmits the radio signal via the antenna 870.

The station 800 either obtains bandwidth in the reserved channel time block in the super frame, or can receive data by contending with the other stations at the unreserved channel time block. Apart from this, the station 800 is able to contend with the other stations during the reserved period for the purpose of the bandwidth allocation.

For this purpose, the PHY unit 860 can receive the beacon frame which is transmitted by the wireless network coordinator, the received beacon frame is output to the decision unit 850.

The decision unit 850 decides, referring to the received beacon frame, whether the period during which the packet for allocating the bandwidth in the network is transmitted/received, that is, the reserved period is included in the super frame or not. The decision can be accomplished by referring to the number of blocks among the information elements of schedule block of the beacon frame, or the stream index field. In other words, when 1 is input to the number of blocks field, or the stream index field is set to bandwidth reservation traffic, the decision unit 850 can identify that the channel time block according to the corresponding schedule block is set to the reserved period.

According to the result of the decision by the decision unit 850, the MAC unit 840 generates the bandwidth allocation request packet, and the PHY unit 860 transmits the bandwidth allocation request packet generated through the designated communication channel to the wireless network coordinator 700. And the wireless network coordinator 700, which has received the packet, transmits the bandwidth allocation approval packet as a response.

There can be a number of stations in the network, where each of the stations competes with one another during the reserved period of the super frame in obtaining the allocation of the bandwidth, and comes to be able to transmit the bandwidth allocation request packet. At this time, the scheme of gaining access to used media can include the scheme of the CSMA/CA or the Slotted Aloha protocol.

In the case where the bandwidth allocation request packet is received, the MAC unit 840 of the station 800 generates data as in the process described above, and the generated data is transmitted through the PHY unit 860 at the channel time block assigned to the bandwidth allocation approval packet, wherein the communication channel at this moment includes the bandwidth of 60 GHz, and wherein the transmitted data can be uncompressed data.

Any station, which has the bandwidth management unit 750 among the stations existing in the network, is able to serve as a wireless network coordinator. Namely, in this case, the station generates a beacon frame to distribute the beacon frame, and then provides other stations with a reserved period, and comes to be able to perform a function to allocate the bandwidth to the other stations selected from contention by generating the bandwidth allocation approval packet to transmit.

It is understood that the combinations each block of accompanied block diagrams and each operation of flowcharts can be executed by computer program instructions. As the computer program instructions may be loaded onto a generic computer, a special purpose computer or other processors of programmable data processing equipments, the instructions to be executed by the computer or other processors of programmable data processing equipments generate the means of performing the functions described in each block of block diagrams or each operation of flowcharts. Since it is possible to store these computer program instructions in computer-available memory or computer-readable memory, which are capable of pointing to the computer or other programmable data processing equipments, for the purpose of implementing the functions in the special scheme, instructions stored in computer-available memory or computer-readable memory are able to generate manufacturing items including instruction means, which perform the functions described in each block of block diagrams or each operation of flowcharts. Since the computer program instructions may also be loaded onto the computer or other programmable data processing equipment, the instructions generating a process that a series of operations are performed in the computer or other programmable data processing equipment to be executed by the computer, and performing the computer or other programmable data processing equipment, is able to provide the phases of performing functions described in each block of block diagrams or each operation of flowcharts.

Further, each block and each operation are capable of representing a module including one or more instructions for executing specific logical function(s), segments or a part of codes. Additionally, it is noted that it is possible to generate the functions mentioned in the blocks and the operations with departing from the orders in several alternative exemplary embodiments. For example, it is actually possible to practically carry out the two blocks or operations described continuously at the same time or sometimes possible to carry out them in reverse order according to the corresponding functions of the blocks or operations.

Figure 9:
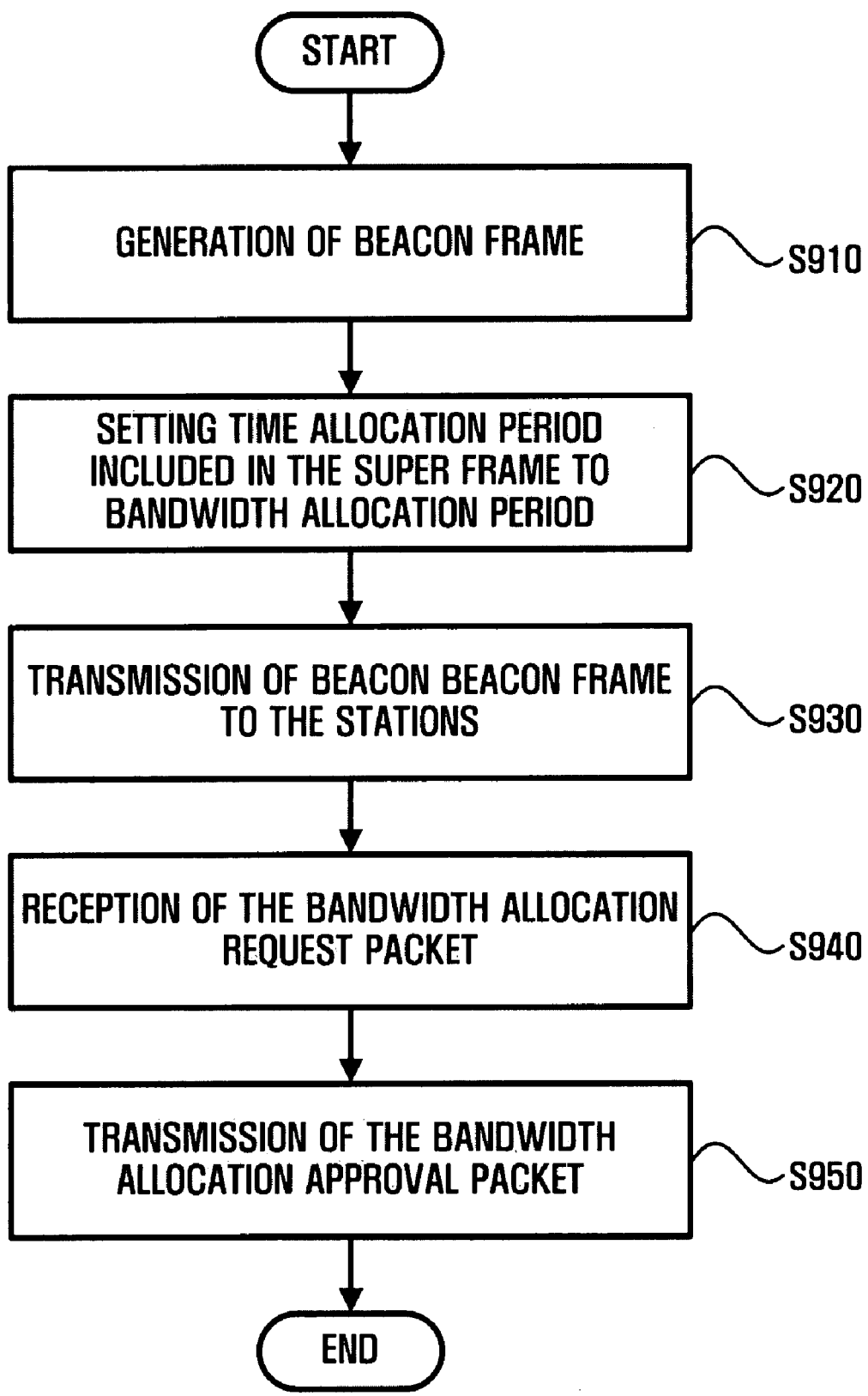
FIG. 9 is a flowchart illustrating operations of a wireless network coordinator according to an exemplary embodiment of the present invention.

FIG. 9 is a flowchart illustrating operations of a wireless network coordinator according to an exemplary embodiment of the present invention.

The MAC unit 740 of a wireless network coordinator generates a beacon frame for constituting the super frame including at least one or more channel time blocks in order to give another chance of contention to the stations setting a reserved period and constituting the network (operation S910).

At this time, the bandwidth management unit 750 can set a specific channel time block among at least one or more channel time blocks included in super frame to a reserved period (operation S920).

The generated beacon frame is transmitted to the beacon period of the super frame and distributed to the stations constituting the network (operation S930), and accordingly, the stations contend with each other for obtaining the bandwidth allocation.

The PHY unit 760 receives the bandwidth allocation request packet from the stations (operation S940). Therefore, the MAC unit 740 generates the bandwidth allocation approval packet. Here, the bandwidth management unit 750 is able to insert the information on the transmitting station, the receiving station, the sorts of data and the corresponding channel time blocks etc. into the bandwidth allocation approval packet. The generated bandwidth allocation approval packet is transmitted through the PHY unit 760 (operation S950).

Figure 10:
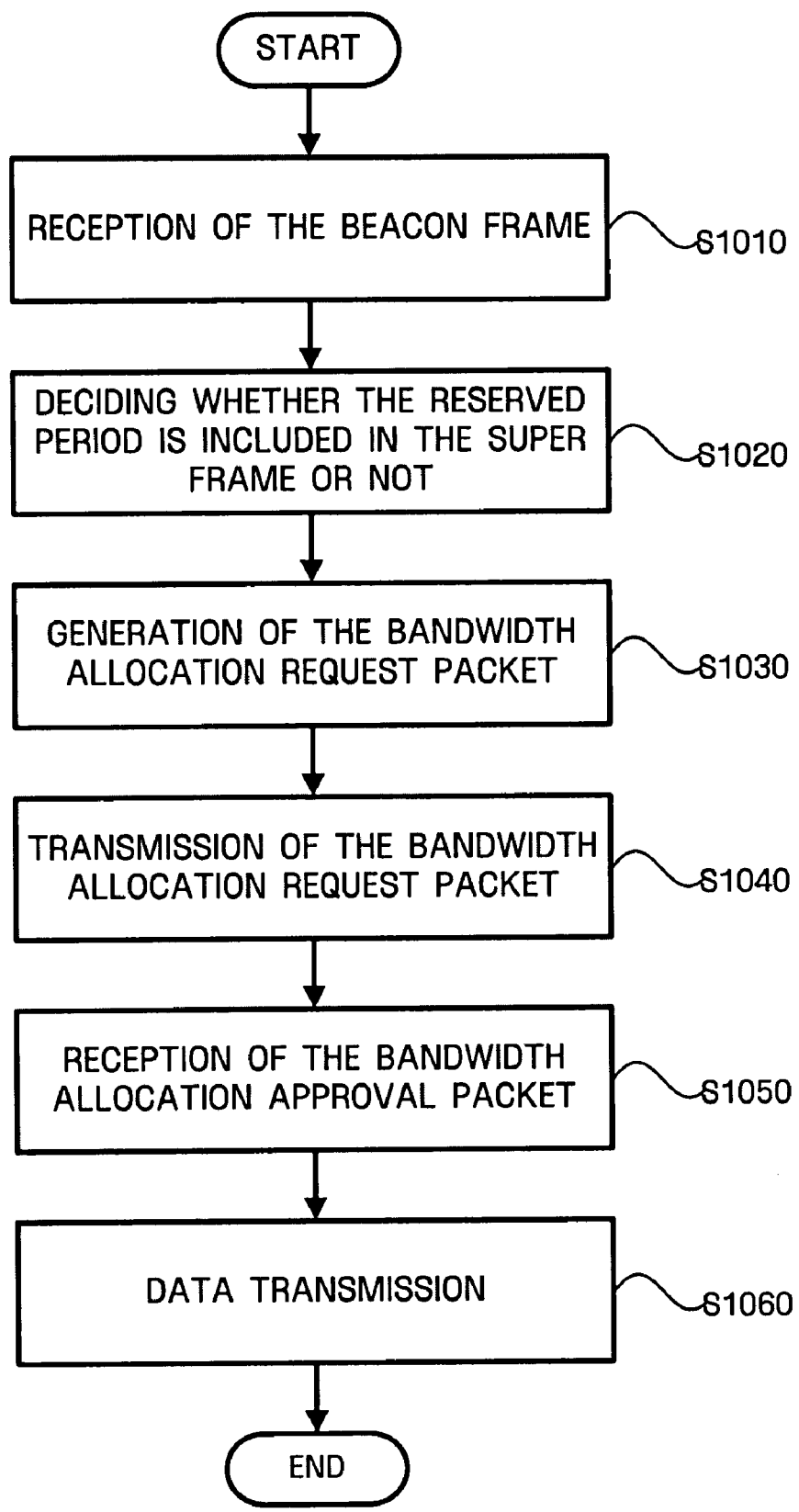
FIG. 10 is a flowchart illustrating a process of data transmitting/receiving of a station according to an exemplary embodiment of the present invention.

FIG. 10 is a flowchart illustrating a process of data transmitting/receiving of a station according to an exemplary embodiment of the present invention.

The PHY unit 860 of the station 800 receives the beacon frame distributed in the network so as to be allocated bandwidth through the reserved period provided by the wireless network coordinator 700 (operation S1010).

The received beacon frame is delivered to the decision unit 850, and the decision unit 850 decides, referring to the received beacon frame, whether the reserved period is included in the super frame (operation S1020). The decision by decision unit 850 may be accomplished by the number of blocks field or the stream index field included in the information elements of schedule blocks.

The decision is delivered to the MAC unit 840, and the MAC unit 840 generates the bandwidth allocation request packet (operation S1030). The generated bandwidth allocation request packet is transmitted by the PHY unit 860 (operation S1040), and the bandwidth allocation approval packet may be received as a response for the bandwidth allocation request packet (operation S1050).

One of the channel time blocks included in the super frame is assigned to be shown clearly in the bandwidth allocation approval packet, and the station 800 comes to be able to transmit the data at the assigned channel time block (operation S1060).

According to the wireless network system and the method of transmitting/receiving the data in the wireless network of the present invention, it is possible to operate the contention for bandwidth allocation more reasonably by separately setting the period of transmitting/receiving of the packet for requesting and approving the bandwidth allocation in the network in the super frame period, and as a result of the setting, transmitting/receiving data through the allocated bandwidth.

Although exemplary embodiments of the present invention have been described for illustrative purposes, those skilled in the art will appreciate that various modifications, additions and substitutions are possible, without departing from the scope and spirit of the invention as disclosed in the accompanying claims. The effects of the present invention are not limited to the above-mentioned effects, and other effects not mentioned above can be clearly understood from the definitions in the claims by one skilled in the art.

What is claimed is:

1. A wireless network coordinator of a network comprising:
    a media access control unit which generates a beacon frame for configuring a super frame comprising a plurality of channel time blocks which comprise at least one reserved channel time block and at least one unreserved channel time block;
    a bandwidth management unit which sets a specified channel time block among the at least one reserved channel time block as a reserved period in which a bandwidth allocation packet is transmitted or received for contention between a plurality of stations in the network to be allocated a bandwidth; and
    a physical unit which transmits the beacon frame, which comprises reservation information on the setting of the specified channel time block as the reserved period by the bandwidth management unit, through a designated communication channel, wherein, before the setting the specified channel time block as the reserved period, the reserved channel time block is set to correspond to a time period in which a station in the network is allocated the bandwidth without contention with other stations in the network, and the unreserved channel time block is set to correspond to another time period in which the station is allocated the bandwidth through contention with the other stations, and wherein the reservation information comprises information indicating an existence, a starting time, a size and a number of the specified channel time block.

2. The wireless network coordinator of claim 1, wherein the bandwidth management unit allows all stations or only a portion of all the stations existing in the network to contend with one another to be allocated the bandwidth by transmitting and receiving respective bandwidth allocation packets at the specified channel time block.

3. The wireless network coordinator of claim 1, wherein the bandwidth allocation packet comprises at least one of a bandwidth allocation request packet which is transmitted from the station to the wireless network coordinator to request a bandwidth allocation to the station, and a bandwidth allocation approval packet which is transmitted from the wireless network coordinator to the station to approve the bandwidth allocation.

4. The wireless network coordinator of claim 3, wherein if the station receives the bandwidth allocation approval packet, the station is allowed to transmit data to another station in the network at one of the plurality of channel time blocks assigned to the bandwidth allocation approval packet.

5. The wireless network coordinator of claim 4, wherein the data comprises uncompressed data.

6. The wireless network coordinator of claim 1, wherein the bandwidth management unit inserts the reservation information in an information element of the beacon frame to execute the setting.

7. The wireless network coordinator of claim 6, wherein the information element comprises:
a source identifier field representing a station transmitting data at one of the plurality of channel time blocks;
a destination identifier field representing a station receiving the data;
a stream index field representing types of the data to be transmitted or received at the one of the plurality of channel time blocks;
a starting time field representing a starting time of the one of the plurality of channel time blocks in the super frame;
a block size field representing a size of the one of the plurality of channel time blocks;
a schedule period field representing a spacing among the plurality of channel time blocks; and
a number of blocks field representing a number of the plurality of channel time blocks in the super frame.

8. The wireless network coordinator of claim 6, wherein the reservation information comprising at least one of:
a source identifier field representing a station transmitting the bandwidth allocation packet requesting the bandwidth allocation;
a destination identifier field representing the wireless network coordinator transmitting a response packet for the bandwidth allocation packet requesting the bandwidth allocation; and
a stream index field representing that the specified channel time block is assigned in order that the bandwidth allocation packet is transmitted or received in the specified channel time block.

9. The wireless network coordinator of claim 8, wherein the bandwidth management unit sets the source identifier as a broadcast in order to allow all stations existing in the network to transmit and receive respective bandwidth allocation packets at the specified channel time block.

10. The wireless network coordinator of claim 1, wherein a plurality of the stations existing in the network contend with one another to be allocated the bandwidth by transmitting or receiving respective bandwidth allocation packets in the specified channel time block.

11. The wireless network coordinator of claim 10, wherein a scheme of the contention comprises a scheme of Carrier Sense Multiple Access with Collision Avoidance or a slotted aloha scheme.

12. The wireless network coordinator of claim 1, wherein the designated communication channel comprises a bandwidth of 60 GHz.

13. A station of a network comprising:
a decision unit which determines, with reference to a received beacon frame, whether a super frame, comprising a plurality of channel time blocks which comprise at least one reserved channel time block and at least one unreserved channel time block, includes a specified channel time block among the at least one reserved channel time block set as a reserved period in which a bandwidth allocation packet is transmitted or received for contention with other stations in the network to be allocated a bandwidth;
a media access control unit which generates a bandwidth allocation request packet for allocating a bandwidth according to the determination by the decision unit; and
a physical unit which transmits the bandwidth allocation request packet through a designated communication channel,
wherein, before the specified channel time block is set as the reserved period, the reserved channel time block is set to correspond to a time period in which the station is allocated a bandwidth without contention with other stations in the network, and the unreserved channel time block is set to correspond to another time period in which the station is allocated the bandwidth through contention with the other stations, and
wherein the beacon frame comprises reservation information on the setting of the specified channel time block as the reserved period, and the reservation information comprises information indicating an existence, a starting time, a size and a number of the specified channel time block included.

14. The station of claim 13, wherein the physical unit transmit data to another station in the network at one of the plurality of channel time blocks in the super frame, if the bandwidth allocation approval packet for the bandwidth allocation is received as a response for the bandwidth allocation request packet.

15. The station of claim 14, wherein the data comprises uncompressed data.

16. The station of claim 13, wherein the bandwidth allocation packet comprises at least one of a bandwidth allocation request packet which is transmitted from the station to a coordinator of the network to request a bandwidth allocation to the station, and a bandwidth allocation approval packet which is transmitted from the coordinator to the station to approve the bandwidth allocation.

17. The station of claim 13, wherein the station contends with the other stations in the network to be allocated the bandwidth by transmitting or receiving the bandwidth allocation packet in the specified channel time block through the physical unit.

18. The station of claim 17, wherein a scheme of the contention comprises a scheme of Carrier Sense Multiple Access with Collision Avoidance or a slotted aloha scheme.

19. The station of claim 13, wherein the designated communication channel comprises a bandwidth of 60 GHz.

20. A method of configuring a network, the method comprising:
generating a beacon frame for organizing a super frame comprising a plurality of channel time blocks which comprise at least one reserved channel time block and at least one unreserved channel time block;
setting a specified channel time block among the at least one reserved channel time block as a reserved period in which a bandwidth allocation packet is transmitted or received for contention between a plurality of stations in the network to be allocated a bandwidth; and
transmitting the beacon frame comprising reservation information on the setting the specified channel time block as the reserved period through a designated communication channel
wherein, before the setting the specified channel time block as the reserved period, the reserved channel time block is set to correspond to a time period in which a station in the network is allocated the bandwidth without contention with other stations in the network, and the unreserved channel time block is set to correspond to another time period in which the station is allocated the bandwidth through contention with the other stations, and
wherein the reservation information comprises information indicating an existence, a starting time, a size and a number of the specified channel time block.

21. The method of claim 20, wherein the setting is performed such that all stations or only a portion of all the stations existing in the network are allowed to contend with one another to be allocated the bandwidth by transmitting and receiving respective bandwidth allocation packets at the specified channel time block.

22. The method of claim 20, wherein the bandwidth allocation packet comprises at least one of a bandwidth allocation request packet which is transmitted from the station to a coordinator of the network to request the bandwidth allocation, and a bandwidth allocation approval packet which is transmitted from the coordinator to the station to approve the bandwidth allocation.

23. The method of claim 22, wherein if the station receives the bandwidth allocation approval packet, the station is allowed to transmit data to another station in the network at one of the plurality of channel time blocks assigned to the bandwidth allocation approval packet.

24. The method of claim 23, wherein the data comprises uncompressed data.

25. The method of claim 20, wherein the setting comprises inserting the reservation information in an information element included in the beacon frame.

26. The method of claim 25, wherein the information element comprises at least one of:
a source identifier field representing a station transmitting data at one of the plurality of channel time blocks;
a destination identifier field representing a station receiving the data;
a stream index field representing types of the assigned data to be transmitted or received at the one of the plurality of channel time blocks;
a starting time field representing a starting time of the one of the plurality of channel time blocks in the super frame;
a block size field representing a size of the one of the plurality of channel time blocks;
a schedule period field representing a spacing among the plurality of channel time blocks; and
a number of blocks field representing a number of the plurality of channel time blocks in the super frame.

27. The method of claim 25, wherein the reservation information comprises at least one of:
a source identifier field representing a station transmitting the bandwidth allocation packet requesting the bandwidth allocation;
a destination identifier field representing the coordinator transmitting a response packet for the bandwidth allocation packet requesting the bandwidth allocation; and
a stream index field representing the specified channel time block is assigned in order that the bandwidth allocation packet is transmitted or received in the specified channel time block.

28. The method of claim 27, wherein the setting sets the source identifier as a broadcast in order to allow all stations existing in the network to transmit or receive respective bandwidth allocation packets at the specified channel time block.

29. The method of claim 20, wherein a plurality of stations existing in the network contend with one another to be allocated the bandwidth by transmitting or receiving respective bandwidth allocation packets in the specified channel time block.

30. The method of claim 29, wherein a scheme of the contention comprises a scheme of Carrier Sense Multiple Access with Collision Avoidance or a slotted aloha scheme.

31. The method of claim 20, wherein the designated communication channel comprises a bandwidth of 60 GHz.

32. A method of transmitting or receiving data in a network, the method comprising:
determining, with reference to a received beacon frame, whether a super frame, comprising a plurality of channel time blocks which comprise at least one reserved channel time block and at least one unreserved channel time block, includes a specified channel time block among the at least one reserved channel time block set as a reserved period in which a bandwidth allocation packet is transmitted or received for contention with other stations in the network to be allocated a bandwidth;
generating a bandwidth allocation request packet for allocating a bandwidth according to a result of the determining; and
transmitting the bandwidth allocation request packet through a designated communication channel,
wherein, before the specified channel time block is set as the reserved period, the reserved channel time block is set to correspond to a time period in which the station is allocated a bandwidth without contention with other stations in the network, and the unreserved channel time block is set to correspond to another time period in which the station is allocated the bandwidth through contention with the other stations, and
wherein the reservation information comprises information indicating an existence, a starting time, a size and a number of the specified channel time block.

33. The method of claim 32, further comprising transmitting data from the station to another station in the network at one of the plurality of channel time blocks in the super frame, if the bandwidth allocation approval packet for the bandwidth allocation is received as a response for the bandwidth allocation request packet.

34. The method of claim 33, wherein the data comprises uncompressed data.

35. The method of claim 32, wherein the station contends with the other stations in the network to be allocated the bandwidth by transmitting or receiving the bandwidth allocation packet in the specified channel time block through the physical unit.

36. The method of claim 35, wherein the contention is based on a scheme which comprises a Carrier Sense Multiple Access with Collision Avoidance scheme or a slotted aloha scheme.

37. The method of claim 32, wherein the dedication communication channel comprises a bandwidth of 60 GHz.

* * * * *